Jan. 25, 1949.  A. E. BRUNNE  2,459,915
CONVEYER FOR DEHYDRATING MACHINES
Filed June 25, 1945  5 Sheets-Sheet 1
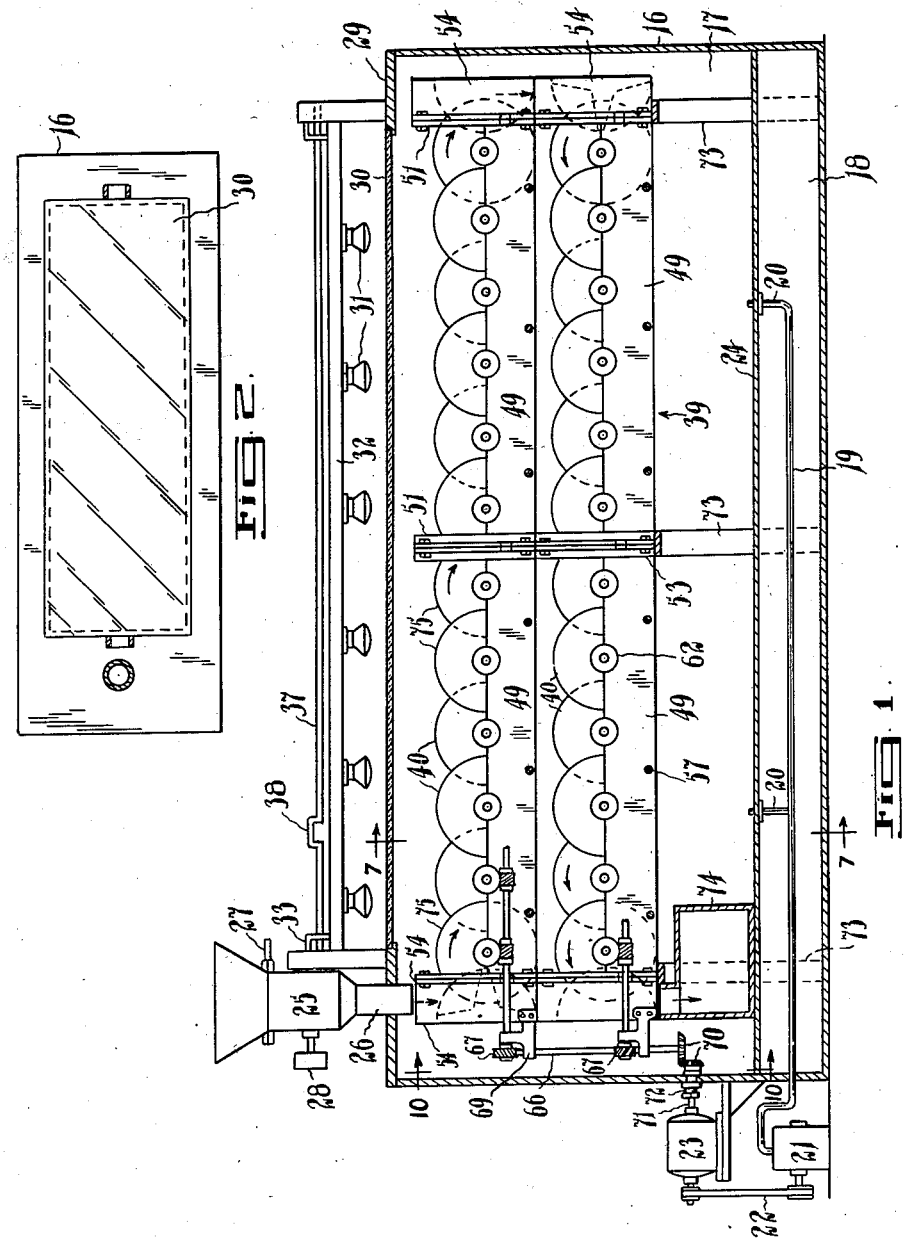
Inventor
Alwin E. Brunne
by Frederick E. Bromley
ATTY.

Jan. 25, 1949. A. E. BRUNNE 2,459,915
CONVEYER FOR DEHYDRATING MACHINES
Filed June 25, 1945 5 Sheets-Sheet 2
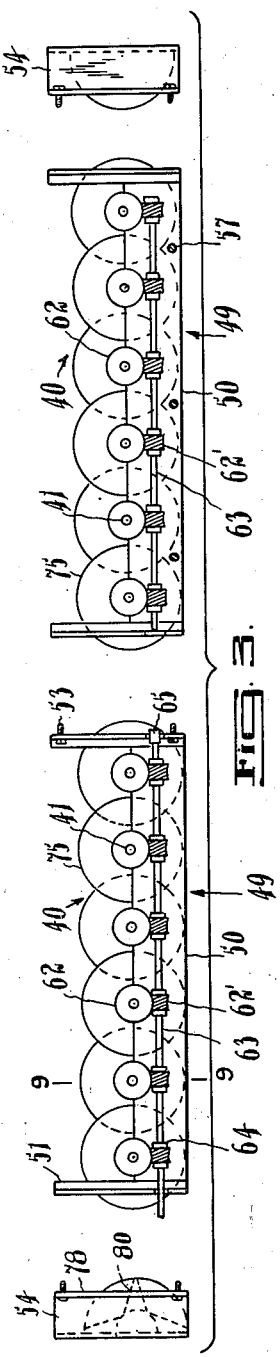
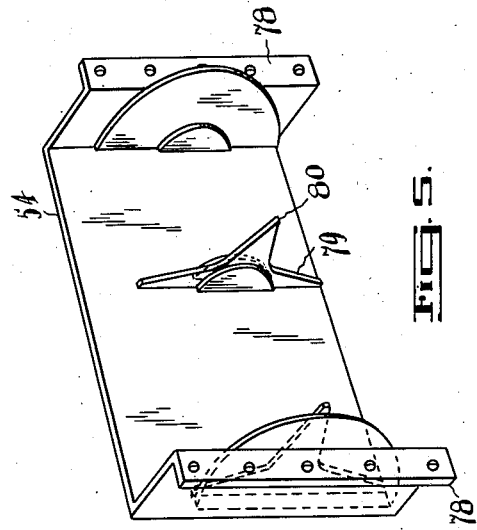
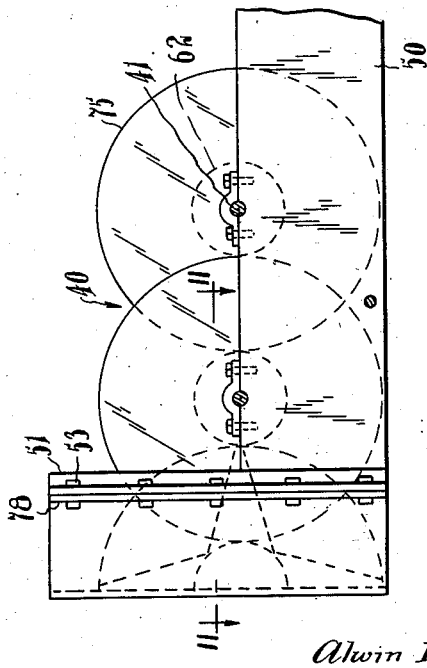
Inventor
Alwin E. Brunne
By Frederick C. Bromley
ATTY.

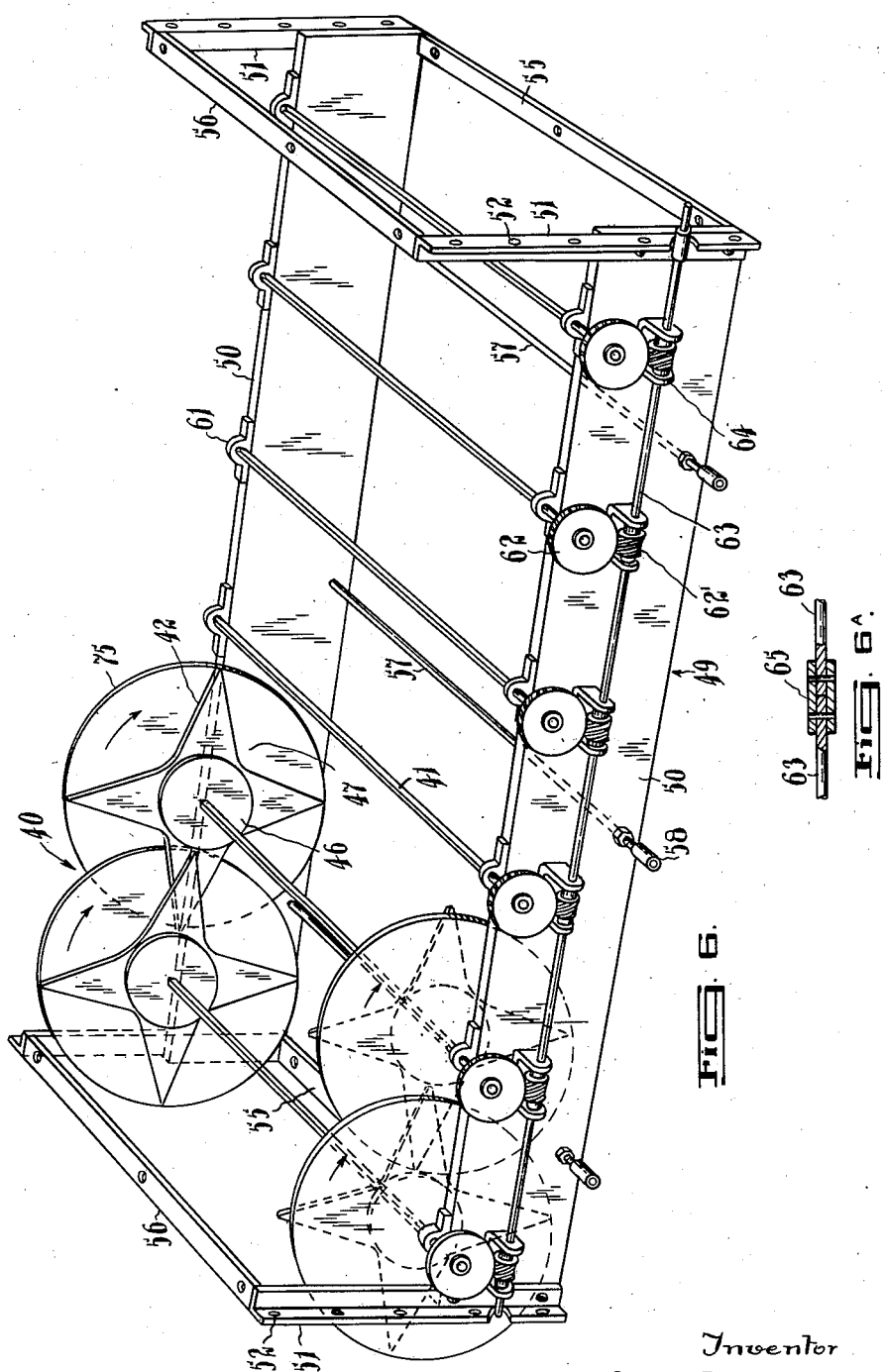

Jan. 25, 1949. A. E. BRUNNE 2,459,915
CONVEYER FOR DEHYDRATING MACHINES
Filed June 25, 1945 5 Sheets-Sheet 4
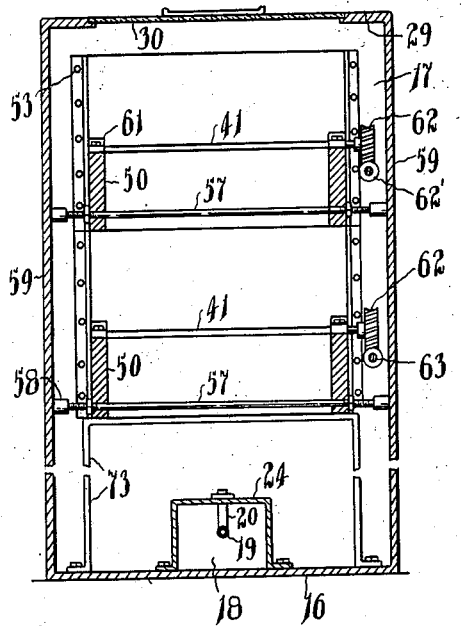
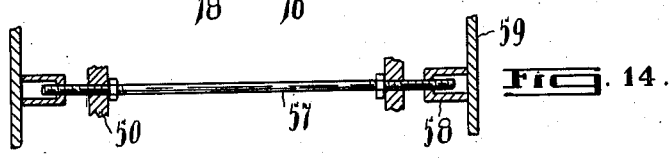
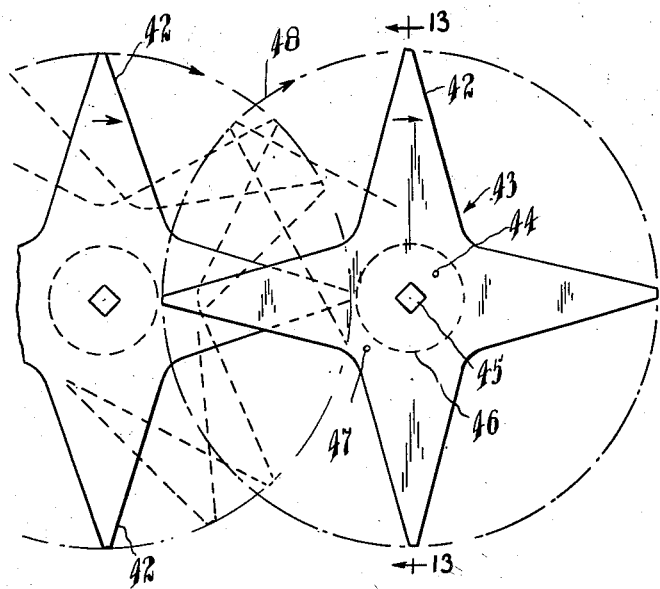
Inventor
Alwin E. Brunne
By Frederick C. Bromley
ATTY.

Jan. 25, 1949.  A. E. BRUNNE  2,459,915
CONVEYER FOR DEHYDRATING MACHINES
Filed June 25, 1945  5 Sheets-Sheet 5
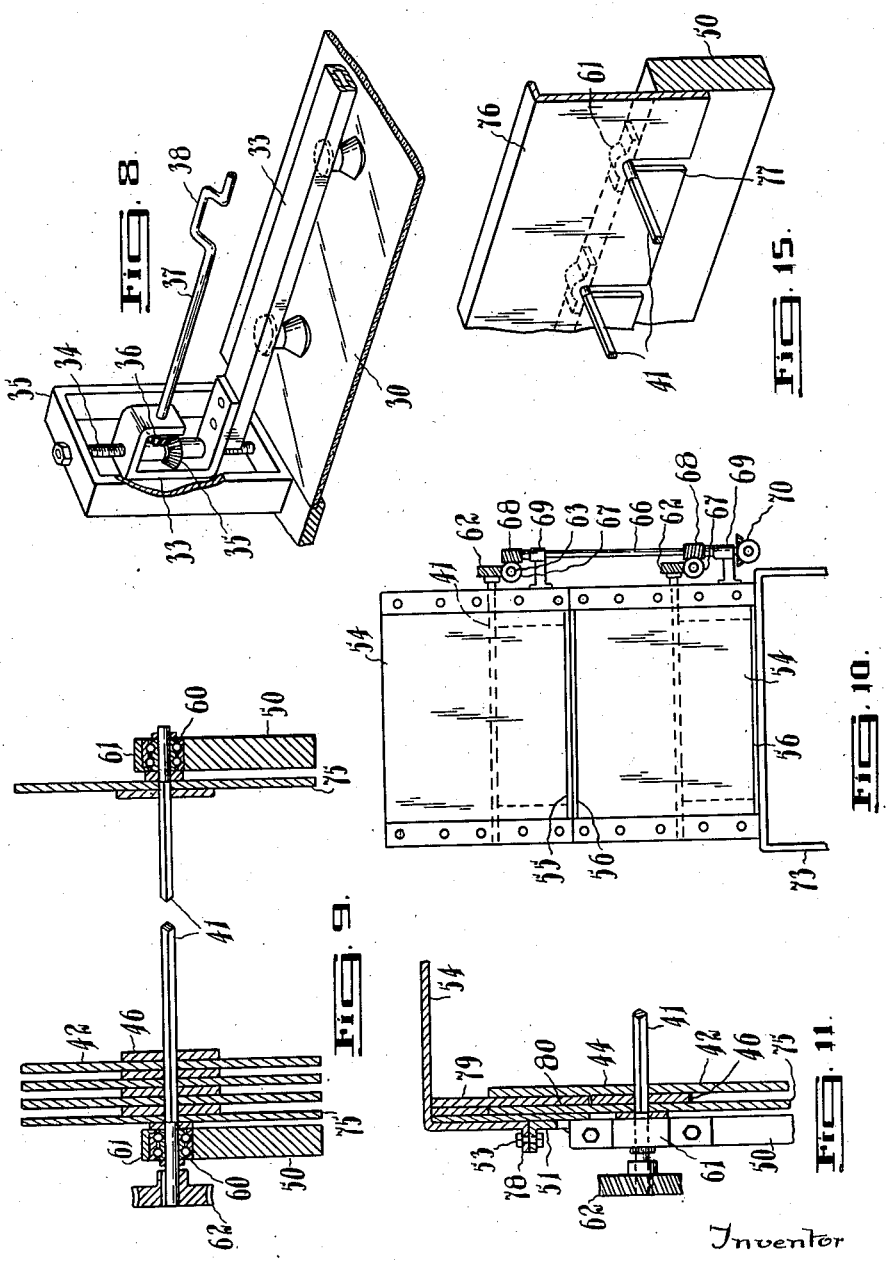
Inventor
Alwin E. Brunne
by Frederick E. Bromley
ATTY.

Patented Jan. 25, 1949

2,459,915

UNITED STATES PATENT OFFICE 2,459,915

CONVEYER FOR DEHYDRATING MACHINES

Alwin E. Brunne, Toronto, Ontario, Canada, assignor of twenty per cent to Harry M. Sherman, Toronto, Ontario, Canada Application June 25, 1945, Serial No. 601,407

2 Claims. (Cl. 198—211)

The invention relates to dehydrating apparatus and particularly concerns a machine for dehydrating materials such as products of natural vegetable growth.

The paramount object of the invention is to provide a highly efficient and compact apparatus by which material can be uniformly desiccated in a continuous process utilizing a novel organization of conveyor mechanism.

Another object of the invention is to produce a machine in which dehydration is carried out in vacuo in an economical treatment which assures of a uniform product, and which is adapted for handling a wide range of material.

Another object is to provide a dehydrating apparatus in which heating and drying of the material is performed by infra-red rays as the material is turned in a gyratory manner substantially uniformly and continuously as it is conveyed along from one point to another in the course of treatment.

Another and important object is to produce a machine which not only effectively dehydrates but also carries out such treatment of foodstuff in a manner which preserves an exceptionally high vitamin content and also the natural colour and flavour of the food.

A further object is to provide a machine having a conveyor structure in which material is conveyed by co-acting blades of a rotary type arranged in sets, each set operating to blandly advance the material with a raising and turning action so that different surfaces of particles of the material are exposed to rays from irradiation lamps and for heat produced thereby for causing evaporation of the moisture uniformly throughout the mass.

A further object is to supply a dehydrating apparatus which by virtue of the novel construction and arrangement of its parts is operable to uniformly remove moisture from foodstuff so that it will be of a consistent desiccated texture throughout its bulk and not merely dried at the surface which would result in the forming of a skin covering an inner layer having an undesirable moisture content.

A still further object is to provide a machine in which dehydration takes place directly by the incidence of infra-red rays while material is being transported along one stretch or run of a conveyor, and in which the desiccating treatment is continued by heat developed by the infra-red lamps as the material is being carried along another stretch or run of the conveyor at a lower elevation and at a reduced temperature.

The invention comprehends a machine having a conveyor structure in which blades of rotary devices interfit and interfunction for movement of material, and in which the rotary devices are grouped in units which are interchangeable and are connected one to another, the structure providing for the production of machines of different sizes and purposes. An important feature of construction is that the units are adapted for arrangement in tiers whereby the over-all length of the conveyor can be increased without lengthening the machine.

Having described the major objects and advantages of the invention, other objects and advantages will appear as the invention is recounted in detail in the ensuing specification and accompanying drawings wherein a practical embodiment of the apparatus is shown by way of illustration but not of limitation.

In the drawings,

Fig. 1 is a sectional elevation of the machine.

Fig. 2 is a top plan view of the cabinet or case thereof showing a glass panel through which rays pass into the machine from the exterior lamps.

Fig. 3 is an exploded elevational view depicting the complemental units of the upper tier of the conveyor.

Fig. 4 is a fragmentary elevation on an enlarged scale of the feed end of the conveyor showing an end plate attached to the first unit for receiving material to be dehydrated and enabling it to be picked up by the initial rotor of the unit.

Fig. 5 is a perspective view of the end plate referred to with reference to Fig. 4.

Fig. 6 is a perspective view of one of the units of the conveyor in which parts are omitted for sake of clarity.

Fig. 6A is a detail showing a coupling for connecting the drive shaft of one unit to that of another.

Fig. 7 is a vertical section through the cabinet or case taken on line 7—7 of Fig. 1.

Fig. 8 is a perspective view of an adjustable supporting bracket for the lamps.

Fig. 9 is a cross section of one of the units taken on line 9—9 of Fig. 3.

Fig. 10 is a left-hand end view of the conveyor taken on line 10—10 of Fig. 1.

Fig. 11 is a fractional horizontal section of the feed end of the conveyor taken on line 11—11 of Fig. 4.

Fig. 12 is a detail in side elevation of spiders of two adjacent rotors showing how they co-act.

Fig. 13 is a section on line 13—13 thereof.

Fig. 14 is a detail typifying the mode of staying the side walls of the cabinet or case against external pressure due to the vacuum.

Fig. 15 is a perspective detail depicting a slight variation in construction of the frame of the units, in which rigid side walls are used.

Referring to the drawings wherein like reference characters designate similar parts through the several figures, there is depicted a selected embodiment of the invention which is substantially the same as a machine which in experiments has demonstrated the practicability and merits of the invention. The apparatus comprises a suitable cabinet or case 16 constructed in approved manner and of a capacity for providing a chamber 17 which houses the conveyor. The case is of greater length than width and is preferably of the rectangular configuration shown in the drawings. The chamber is hermetically sealed as is necessary for dehydrating materials in vacuo, as is well understood in the art.

At the base of the case there is provided a compartment, indicated at 18, which is not evacuated and which serves to contain the piping through which air is pumped from the chamber 17 and by which a suitable vacuum is maintained in the chamber in the operation of the apparatus. Said piping in the present instance consists of a main line 19 and branch lines 20. Said main line 19 extends through the case 16 to a customary exhauster 21 driven as by the belt 22 from an electric motor 23. The branch lines 20 communicate with the chamber 17 through the floor 24 thereof. It will be understood that the case will be fitted with gauges and other accoutrement common to dehydration apparatus for indicating and regulating temperature and vacuum, etc., as is required to effectively treat materials uniformly.

At the left end of the case there is provided a hopper 25 arranged over the case and supplied with a spout 26 for feeding material to the conveyor for treatment. The construction of the hopper is not detailed for it may vary in accordance with the material to be processed. A hopper of a known type may be used. In treating fruits and vegetables, hopper structures of the prior art provide for cutting and slicing such materials ready for processing. The hopper 25 is of this variety and may have a shut-off valve 27 and a pulley drive 28 for the slicing mechanism (not shown).

The type 29 of the case is depicted as supplied with a section of its area permeable to heat rays, which section is composed of a glass panel 30 suitably attached. Infra-red rays are employed as the heating and drying medium, for which purpose there is provided a group of lamps 31 for emitting such rays. The lamps are arranged over the glass panel 30 so that the rays will pass through the same onto the upper stretch of the conveyor. The electric circuit for the lamps is supplied with a suitable arrangement of switches (not shown) by which they can be selectively controlled so that the number in use at one time may be varied. The heat may thus be controlled to meet the demands of the material undergoing treatment.

The lamps are preferably adjustable bodily to and away from the case 16 so that the direct heating and drying effect of their rays on the material carried by the upper stretch of the conveyor may be varied. To this end the lamps are suspended upon a mount comprising a horizontal member 32 having each of its ends rigidly attached to a bracket 33 which is loosely sleeved on a stationary screw 34 vertically supported in a standard 35. Each bracket is of a C-shaped configuration and contains a pair of meshing bevel gears 35 and 36. The gear 35 is threadedly engaged with the screw 34 and shouldered between the upper and the lower parts of said bracket so that when it is turned it will raise or lower the bracket according to the direction in which it moves. The gear 36 is journalled on the bracket to which it belongs by means of a shaft 37 that extends between the pair of brackets. Said shaft has a crank element 38 by which it can be turned by hand which rotates the gears 36 in unison for moving the brackets 33, thus bodily shifting the lamp support 32 with a parallel movement. This mechanism for positional adjustment of the lamps is given by way of example but not of limitation as it will be understood that other ways of achieving this result may be employed without departing from the invention.

The conveyor, denoted as a whole by the reference character 39 in Fig. 1, comprises a continuity of similar rotors 40 having a driving connection by which they are all turned simultaneously at a uniformly slow speed for progressively advancing material from one to another by the action of radial blades which assure of a desirable tumbling or turning of the material during each stage of advancement. Since the rotors are of identical construction a description of one will suffice. A rotor comprises a transversely arranged shaft 41 journalled in a frame for connection to a driving member. The shaft 41 rigidly carries a series of spaced radial blades 42 which are of uniform thickness and fairly thin compared to their breadth which lies in a plane at right angles to the axis about which they turn. The blades are spaced apart a distance to admit freely the blades of another rotor so as to provide a construction in which adjacent blades permit of the interfitting of a blade of the other rotor with just sufficient clearance to make a working fit. The blades are sheet metal members formed of stainless steel.

Most satisfactory results are obtained by fashioning the blades of spider-like members stamped from sheet stock by ordinary dies so as to provide four arms or blades on a spider spaced equidistantly therearound in a common plane. The spider, denoted at 43 in Fig. 12, has a hub portion 44 whose sides are flush with said arms or blades 42, which radiate therefrom. To mount the spider non-rotatably on the shaft 41 it is provided with a central hole 45 of a square shape and the shaft is made of a similar shape in cross section. A distance piece, such as a washer 46, is employed to space one spider from another on the shaft in order to produce the required lateral spacing of their adjacent blades for interfitting of blades of another rotor.

It will be seen that by this construction the rotor is formed by assembling a proper number of spiders and washers on the shaft alternately. This provides a rotor structure which can be manufactured at low cost. The spiders and the interposed washers can be locked in assembly as by a common expedient such as the provision of lock nuts on the shaft 41. It will be noted that the spiders produce four sets of blades on the shaft each set extending parallel to the shaft-axis at right angles to an adjacent set. An important feature of construction is that the washers are of a size smaller than the hubs 44 of the spiders in order to provide an uninterrupted wall portion 47 on each spider outwardly of the washers and defined by the apexes of the meeting edges of adjacent blades of each spider. The reason for the wall portion 47 will presently appear.

Having described the construction of the rotors, their relative arrangement and interfunctioning will now be related. In any stretch or run of the conveyor the rotors turn in the same direction and the shafts 41 are spaced so that the blades of one rotor interfit with blades of an adjacent rotor to extend within working clearance of the washers on that rotor in turning through a plane containing the axes of the rotors. The spiders on one rotor are of course necessarily offset with respect to those on the adjacent rotor to provide for the interfitting of the blades, which is only a matter of the manner in which the spiders and the washers are assembled on one shaft with respect to those on another shaft. The sets of blades of one rotor are correspondingly positioned angularly to those of the adjacent rotor therefore when the rotors assume a position in which sets of blades are vertical there is a set of blades on one rotor in horizontal disposition fully interfitting with a set on the adjacent rotor. The mating sets of horizontally interfitting blades thus form a trough with the upper sets of vertical blades for receiving material. Having particular reference to Fig. 12, it will be seen that the horizontal set of blades of the foremost adjacent rotor in sweeping upwardly lifts the material in the trough and describes an arc of an orbit, denoted at 48, which completely bisects the upper set of vertical blades of the rearmost rotor, as is indicated in dash lines. In the result there is an intercepting action which assures of complete advancement of the mass of materials without the possibility of any of it escaping by dropping through any avenue that might be opened up in the operation of the blades. Additionally the blades having a wiping action which completely removes the material from each set of blades in their delivery operation; and in the receiving or lifting operation their rear edges block or guard against precipitate advancement of material which is most important in treating nuts or like foods which are apt to roll in being advanced over a rotor by the turning or tumbling action inherent in the operation of the conveyor.

A further feature of the construction is that the outer ends of the blades are flanked in their lifting action by the outer portions 47 of the hubs 44 and then by the blades between which they pass. Consequently they are laterally supported against being sprung out of alignment by wedging of any solid particles of material.

The blades permit heat to reach the supported surfaces of the material which enhances evaporation of moisture and promotes uniform and expeditious dehydration. While the material is being advanced from one rotor to another the blades turn it with a gentle tumbling action which assures that different surfaces will be exposed to the heating and drying medium.

The rotors are preferably mounted in a frame having sections at different elevations in the form of tiers by which material is advanced from the source of supply along an upper tier and then along a subjacent tier in reverse direction. This arrangement provides a compact machine and any number of tiers can be used, though only two are illustrated in the drawings. The material on reaching the end of the first tier is discharged onto the receiving end of the subjacent tier and upon arriving at the end of the second tier is discharged into a suitable receptacle.

Said sections are composed of a plurality of units which are duplicates of each other and which enable a conveyor of any size to be built merely by using a required number of the units. The construction provides for the manufacture of machines having conveyors of different lengths and capacities to meet the demands of various materials. As clearly depicted in Fig. 1, the frame in the present instance is comprised of four units, each denoted as a whole by the reference character 49. The construction of a unit is more clearly detailed in Fig. 6. The structure comprises a pair of co-extensive frame-members or sills 50 horizontally arranged and spaced apart to accommodate a longitudinal series of the rotors. The ends of the sills are provided with attachment members 51 secured thereto or integral therewith. Said attachment members are vertically arranged to extend from the bottom of the sills to a point above the top thereof. The uprights 51 are pierced as at 52 to receive fastening elements 53 by which those at one end of the unit are connected to uprights of the other unit of a frame-section. The uprights at the other or outer end of the unit serve to attach an end plate 54 thereto. The sills are rigidly united by crossbars 55 and 56 located at the ends thereof. The crossbars 55 extend below the uprights 51 and the crossbars 56 extend across the top of the uprights and are affixed thereto. The sills are braced at intervals throughout their length as by stay bars 57 which project outwardly thereof and have their projecting ends threadedly engaged with abutment elements 58 which are screw adjusted to bear against the side walls 59 of the case 16 to sustain them against sagging due to external pressure caused by vacuum.

The shafts of the rotors are journalled on the sills by means of anti-friction bearings 60 secured detachably as by caps 61 which enable the rotors to be removed individually. At one side of said unit the shafts are provided with worm wheels 62 engaged with worms 62' keyed on a drive shaft 63. The drive shaft rotates in bearings 64 applied to the adjoining sill and extends the full length of the sill. The gearing thus operates all the rotors of the unit in the operation of the drive shaft. The drive shafts of each two frame sections are joined together at their inner ends as by a standard coupling 65, detailed in Fig. 6A.

An outer end of the united shafts 63 of each frame section or tier of the conveyor is geared to a vertical shaft 66 by a worm wheel 67 and a worm 68. The vertical shaft is suitably supported in bearings 69 and connected as by bevel gears 70 to the motor 23, whose shaft 71 extends through the end of the case 16 for this purpose and is fitted with a stuffing box 72 for sealing the opening which admits the shaft into the case. From the foregoing description it will be manifest that the shafts 63 of the several units are concurrently driven in the operation of the motor. In order that the rotors of the units which form the lower frame-section or tier, may be driven reversely to those of the upper frame-section one set of the gears 67 and 68 is formed with teeth for a right-hand drive and the other set is formed with teeth for a left-hand drive.

In assembling the upper and the lower sections of the conveyor frame the units of the upper section are placed directly over those of the lower section and seated on the crossbars 56 thereof and fastening elements are used to secure these crossbars to the corresponding crossbars 55 at the bottom of the upper units. The conveyor is supported above the floor 24 of the case by suitable means such as the benches 73 which are bolted to the crossbars 55 at the bottom of the lower section or tier.

In the operation of the conveyor the material to be treated is delivered by the hopper 25 to the receiving end thereof and fed along by the rotors of the upper tier to the other end thereof where it is dropped to the receiving end of the lower tier and carried in reverse direction to the discharge end of the conveyor. Below the discharge end a suitable receptacle, indicated at 74 is located into which the treated material drops.

In order to retain the material on the conveyor during transit and to guard against spilling of the same laterally of the frame the rotors are provided with discs 75 at their ends which are of substantially the same size as the spiders and are similarly mounted on the shafts 41 to rotate therewith. The discs of adjacent rotors overlap at each side of the frame and thereby form a wall which projects above the respective sills.

As an alternative construction the discs 75 may be dispensed with and fixed side walls 76 used instead, as indicated in Fig. 15. In this event the side walls 76 would be applied to the sills 50 to extend between the end uprights thereof. Ordinary fastening means would secure the side walls 76 in place. Stainless steel would be used for such side walls which could be slotted as at 77 to fit over the rotor shafts 41 to enable them to be removed without disturbing the rotors.

The end plate 54 at the receiving end of the upper section of the conveyor is best discernible from an inspection of Fig. 5, and is substantially of a U-shape in plan, having flanges 78 by which it is attached to the frontal uprights 51 of the first unit. The end plate is located beneath the spout 26 of the hopper and serves to guide material therefrom onto the initial rotor. Desirably it has a transverse series of fixed vertical elements 79 similar in shape to a half section of said rotor-spiders and provides horizontal blades 80, which interfit with the blades of said initial spider. Said vertical elements form a grille onto which material drops from said spout and is picked up by the blades of said initial rotor. The end plate 54 at the receiving end of the lower conveyor section is of similar construction and operates to receive material dropped from the discharge end of the upper section, or tier. The end plate 54 on the discharge end of the upper section and that on the discharge end of the lower section are both plain U-shaped elements devoid of said elements 79, and merely operate as a chute for gravity discharge of the material.

From the preceding description it will be understood that the invention provides a dehydrating apparatus in which material is repeatedly turned in a gyratory manner as it is being conveyed to assure of its being uniformly desiccated and in which it is subjected to intense heat of infra-red rays during a part of its travel and to a lower heat as it is carried away from the direct heat of the lamps. It will also be understood that the conveyor is suitable for conveying various materials, such as shelled fruits in a roasting operation, and need be confined to the specific construction and arrangement of the herein disclosed dehydrating apparatus, and such changes and modifications of the invention may be resorted to as come within the scope of the invention as defined in the subjoined claims.

What I claim is:

1. In a machine of the class described, a conveyor-frame formed of interchangeable units, each unit comprising a pair of spaced sills, a continuity of rotors journalled therein and arranged transversely thereof, said rotors having interfitting blades adapted to move material longitudinally of said sills, means securing said sills to each other, flanged uprights on the ends of said sills projecting above the rotors thereof for mounting one unit on another and for connecting units in end-to-end relation, a drive shaft substantially co-extensive with one of said sills of each unit, gearing individually connecting the rotors of each unit to the drive shaft thereof and for driving the shaft of one unit from the shaft of another unit, a U-shaped end plate attached to the end of sills of one unit and having blades thereon interfitted with the blades of the adjacent end rotor of this unit, and a U-shaped end plate adapted for attachment to the flanged uprights at the opposite end of a unit for forming a discharge member.

2. In a dehydrating machine, a conveyor for use in a drying chamber heated by infra-red lamps, said conveyor comprising a longitudinal series of transverse rotors driven unidirectionally at a uniform speed, said rotors each including a driven shaft, a series of blades formed of relatively thin flat plates of uniform thickness, each blade having a central hub portion held on said shaft against independent rotation and having radial arms forming a spider-like blade, said arms tapering on straight lines from said hub portion to a point; and washers interposed between adjacent blades, said washers being of a diameter substantially equal to said hub portions and being of a width just sufficient to space the blades to admit those of an adjacent rotor with a working fit; adjacent rotors being juxtaposed such that the arm portions of their blades interfit whereby in the conveying operation material is turned over and over to expose the surfaces of its components to the infra-red rays of said lamps.

ALWIN E. BRUNNE.

REFERENCES CITED

The following references are of record in the file of this patent:

UNITED STATES PATENTS

| Number | Name | Date |
|---|---|---|
| 888,257 | Passburg | May 19, 1908 |
| 1,012,046 | Anderson | Dec. 19, 1911 |
| 1,856,668 | Sylvester | May 3, 1932 |
| 1,971,547 | White | Aug. 28, 1934 |
| 2,349,300 | Olsen | May 23, 1944 |
| 2,355,671 | Naeher et al. | Aug. 15, 1944 |